Jan. 25, 1944.  J. H. MARTIN ET AL  2,339,868
STILL OF THE THERMO-GENERATOR TYPE
Filed June 11, 1940  2 Sheets-Sheet 2

Inventors
JOHN H. MARTIN
MAC MARTIN
By E. V. Hardway
Attorney

Patented Jan. 25, 1944

2,339,868

UNITED STATES PATENT OFFICE 2,339,868

STILL OF THE THERMOGENERATOR TYPE

John H. Martin and Mac Martin, Houston, Tex.

Application June 11, 1940, Serial No. 339,905

14 Claims. (Cl. 196—8)

This invention relates to a still of the thermo-generator type and includes also the process of thermo-generator distillation.

An object of the invention is to provide apparatus of the character described whereby gas or vapor may be driven off from the liquid containing the same and thereafter condensed into liquid form, the apparatus embodying novel means for causing the separation of the gas from the liquid.

It is another object of the invention to provide an arrangement whereby the liquid, containing the gas to be released, will be automatically circulated by the application of heat to the generator thus dispensing with additional mechanical means for causing the circulation of the liquid.

Another object of the invention is to provide in a still a novel and convenient combination of a bubble tower, generator-separator and heat exchanger whereby the liquid being circulated between the tower and generator will be maintained at the required temperatures to obtain the best results.

The invention also includes novel and efficient means for maintaining the liquid at the desired level.

The invention further comprehends a novel process of thermo-generator distillation.

The invention has been primarily designed for the purpose of extracting from natural gas, escaping from wells as a petroleum by-product, the elements which are capable of being condensed and reduced to liquid of useful form such as gasoline, butane, propane, or the like. However, the apparatus is capable of general use for carrying on the process of driving off gas or vapor from a liquid by heat and condensing products therefrom.

With the above and other objects in view the invention has particular relation to certain novel features of construction, operation and arrangement of parts, and to a novel process, an example of which is given in this specification and illustrated in the accompanying drawings, wherein.

Figure 1:
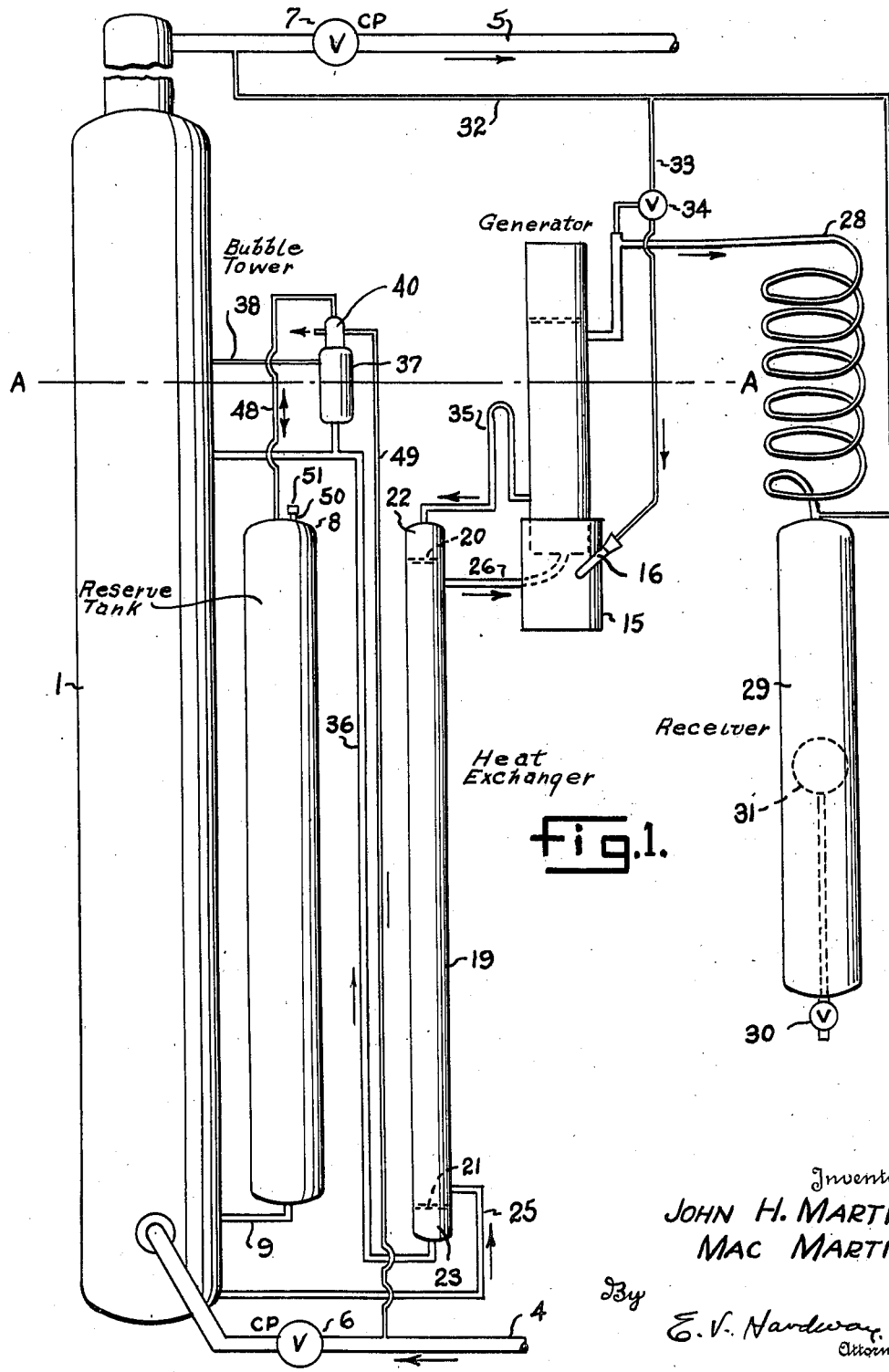
Figure 1 shows an elevational view of the complete distillation system.
Figure 2:
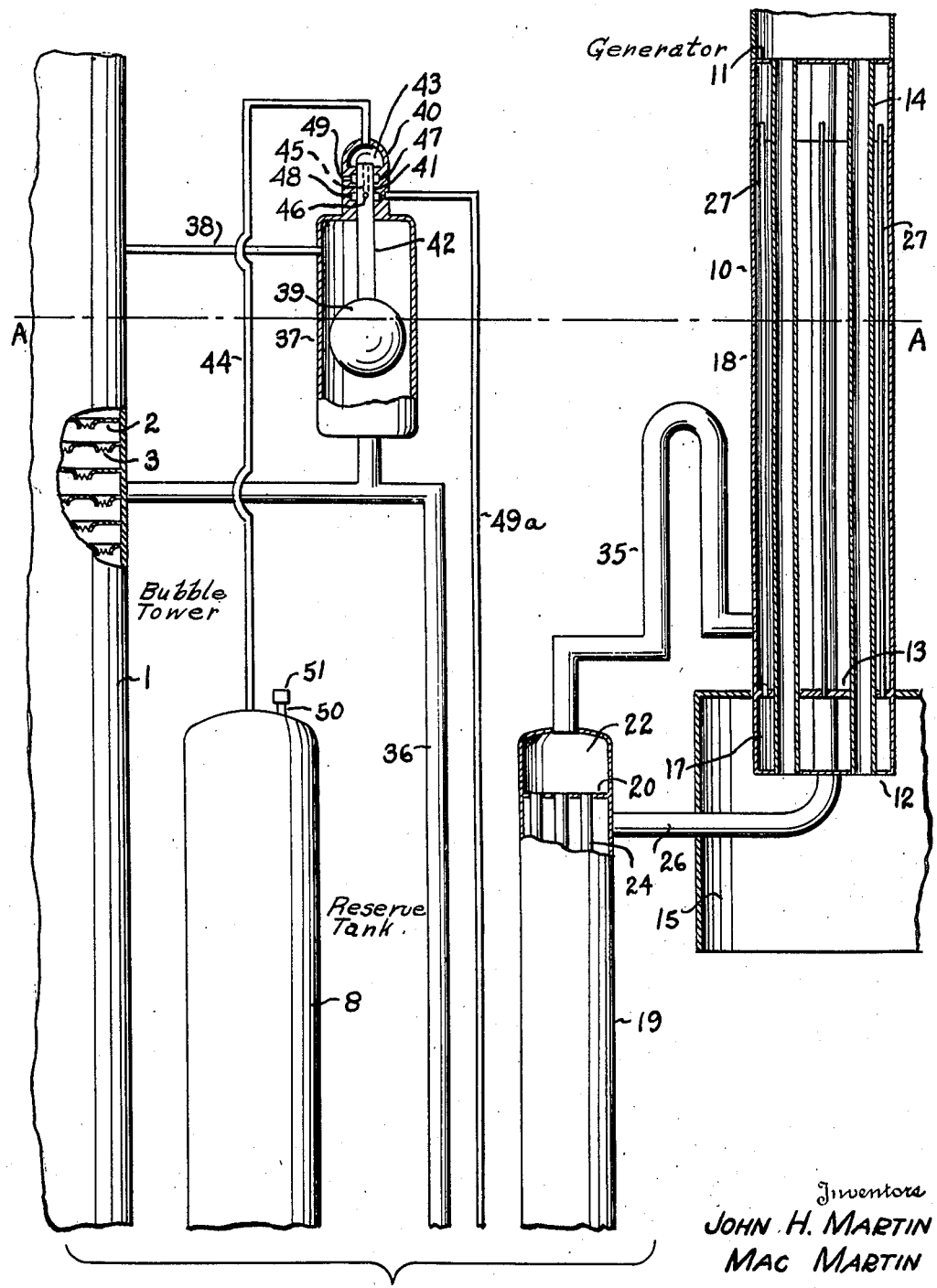
Figure 2 shows an enlarged, fragmentary, elevational view, partly in section.

Referring now more particularly to the drawings wherein like numerals of reference designate the same parts in each of the figures, the numeral 1 designates a bubble tower, preferably in the form of an upright cylinder. If desired this tower may be provided with transverse partitions 2 spaced apart one above the other, said partitions being perforated throughout and the perforations being surrounded by depending serrated flanges 3 thus forming, in effect, a conventional type of bubble caps. In carrying on the distillation process this bubble tower will be kept filled to the selected level, such as indicated by the line A—A, with an absorption oil, kerosene or similar liquid having an affinity for the hydrocarbon elements to be extracted from the natural gas and condensed.

In the present illustration there is shown an inlet gas line 4 leading from the well and entering the lower end of the tower 1 through which the natural gas may be introduced into the absorption liquid in the tower. This natural gas will pass upwardly through the tower and will become intimately mixed and intermingled with the absorption liquid therein and the products from the gas to be distilled will be trapped out of said gas and retained within the absorption liquid, the lean remainder of the gas passing on upwardly through the tower and out through the relief line 5 leading from the top of the tower above the liquid level. The lines 4 and 5 are equipped with suitable control valves 6, 7. It is to be understood that the gas entering through the inlet line 4 will be under considerable pressure and the valves 6, 7 may be so regulated as to maintain the required pressure in the distillation system.

If desired, the bubble tower may be provided with a reserve tank 8 which is preferably, though not necessarily, of an upright, cylindrical form, as shown. Its lower end is connected into the tower by means of the tubular connection 9 and it contains a reserve supply of the absorption liquid to be from time to time delivered into the tower as hereinafter indicated.

The apparatus also embodies a generating tower wherein the vapors entrained in the absorption liquid from the natural gas will be released. This generating tower, or generator, embodies a cylindrical jacket 10 having the upper transverse partition 11, forming the upper end thereof, the lower transverse partition 12 forming the lower end thereof and an intermediate transverse partition 13 spaced a selected distance above the transverse partition 12. Extending through these partitions but in sealed relationship therewith are the flues 14 which lead upwardly from the furnace 15 in which there is located a suitable burner 16. The jacket 10 is provided with the receiving chamber 17 between the partitions 12, 13 and the return chamber 18 between the partitions 11, 13.

The rich absorption liquid laden with the elements to be extracted from the natural gas, is delivered from the tower 1 into the receiving chamber 17 wherein it is boiled by the heat generated from the burner 16.

In the present illustration a heat exchanger is shown through which the absorption liquid is delivered from the tower into the chamber 17. This heat exchanger embodies an outer shell 19 having the upper and lower transverse partitions 20, 21 across the same forming the upper and lower chambers 22, 23. A series of tubes 24 connect said chambers 22, 23 and are anchored to the corresponding partitions 20, 21. The absorption liquid may be delivered from the tower 1 through the pipe 25 into the shell 19 above the partition 21 and will pass upwardly around the tubes 24 and thence out through the pipe 26 into the chamber 17. A plurality of percolating tubes 27 are anchored at their lower ends to the partition 13 and communicate with the chamber 17. They extend up between the flues 14 and their upper ends terminate within the chamber 18 a short distance beneath the upper end thereof. The heat to which the absorption liquid is subjected in the chamber 17 will cause said liquid to boil up through the tubes 27 and as it emerges from the upper ends of said tubes 27 it will suddenly expand and the elements sought to be recovered will be released in the form of gas and will pass on out from the upper part of the chamber 18 into the condenser coil 28, of considerably lower temperature, thus causing said gases to condense. The generator containing a receiving chamber and a return chamber, preferably located above the receiving chamber and separated therefrom, with means for heating the liquid in the receiving chamber to cause its ebullition through restricted passageways or tubes, over the free ends of which the liquid breaks thus releasing the vapor from the liquid and causing the stripped liquid to return into the return chamber constitutes what is believed to be a novel type of generator for a novel method for separating the vapor from the liquid as distinguished from the use of mechanical circulating means or the employment of the so-called thermo-siphon principle of circulation.

A suitable receiver as 29 may be provided, if desired, to receive the condensed liquid which may be delivered therefrom from time to time through a valve 30 which may, if desired, be arranged to be intermittently opened by a float 31 within the receiver 29.

A tube 32 is connected, at one end, into the relief line 5 between the tower 1 and the valve 7 and at its other end is connected into the lower end of the condenser coil. This is necessary in order to allow the gas released in the chamber 18 to freely enter the condenser coil.

The burner 16 is supplied with its fuel through the supply pipe 33 leading from the tube 32. The supply pipe 33 is controlled by a thermostatically operated valve 34 whereby the selected temperature may be maintained. It is to be noted that the pressure regulator valve 7 regulates the pressure within the system and the thermostatically controlled valve 34 regulates the temperature. Accordingly, the temperatures and pressures may be varied by appropriately regulating said valves 7 and 34. These variations in pressure and temperature are necessary depending on the character of the product sought to be recovered: For example, different pressures and temperatures are required for the recovery of gasoline than would be the case if butane or propane are to be extracted from the natural gas.

The absorption liquid, from the receiving chamber 17, breaking over the upper ends of the percolating tubes 27 falls back into the return chamber 18 and is returned from said chamber 18 through the inverted U-tube 35, which leads from the chamber 18 above the partition 13, into the chamber 22 and flows thence downwardly by gravity through the tubes 24 into the chamber 23. This returning liquid is of a high temperature. If gasoline is being distilled it will be in excess of 300° F. while the normal temperature of the absorption liquid passing upwardly through the shell 19 around the tubes 24 will be about 80° F. Therefore, there will be a heat exchange, the liquid advancing upwardly through the shell 19 being gradually heated so that it will have attained a high degree of temperature when it enters the receiving chamber 17 and the returning liquid being gradually cooled so that when it reaches the chamber 23 it will be of a temperature of about 80° F. From the chamber 23 the returning liquid passes through the circulating pipe 36 and re-enters the tower 1 beneath the level of the liquid therein.

It will be seen, therefore, that the natural gas may be circulated through the absorption liquid and thereby stripped of the elements therein sought to be recovered and said absorption liquid, laden with said elements may be continuously circulated through the system and the desired elements distilled out of the absorption liquid and condensed and recovered for commercial uses, the circulation of the absorption liquid being induced by the application of heat to the generator within the system itself and without the necessity of mechanical circulating apparatus and the use of the thermo-siphon principle thus conducing to cheapness of construction and making it practical to equip a well, or wells, with individual distillation units of this type.

It is desirable that the level of the liquid in the tower be maintained at a point beneath the upper ends of the percolating tubes 27. Means have been provided for that purpose which will now be described:

A housing 37 is provided which encloses a float chamber having its lower end connected into the circulating pipe 36 and its upper end connected, by the pipe 38, into the tower above the selected liquid level. In the float chamber there is a buoyant float 39. The upper end of the housing is formed into a valve casing 40 having a cylindrical valve seat 41 therein and a stem 42 upstands from the float and its upper end is formed into a cylindrical valve which fits within the valve seat 41. The upper end of the valve casing 40 contains a chamber 43 and a pressure line 44 leads from said chamber and is connected into the upper end of the reserve tank 8. The valve at the upper end of the stem 42 has an axial bore 45 leading from its upper end and terminating in a side port 46. The valve seat 41 has the upper and lower, annular, countersunk grooves 47, 48. The groove 47 has a port 49 leading to the free atmosphere and leading from the groove 48 and entering the gas supply line 4 out beyond the valve 6 there is a pressure line 49a. Should the liquid level fall the float 39 will fall with it registering the port 46 with the groove 48 permitting the gas under higher pressure to flow through the line 49a and the port 45 and the pressure line 44 subjecting the liquid in the reserve tank 8 to additional pressure and forcing additional liquid into the tower 1 to raise the liquid level therein. Thereupon the float 39 will be raised to carry the port 46 out of registration with the groove 48 thus closing the pressure line 49a. Should the liquid level in the tower 1 rise, the float 39 will rise correspondingly registering the port 46 with the groove 47 thus communicating the reserve tank 8 with the free atmosphere, decreasing the pressure therein and allowing the return flow of liquid from the tower 1 into the tank 8 causing the liquid level in the tower 1 to be lowered. The float 39 will be correspondingly lowered thus moving the port 46 out of registration with the groove 47 and closing the pressure line 44. The liquid level in the tower 1 will thus be automatically controlled.

It is to be here noted, however, that the particular type of heat exchanger employed as also the particular type of liquid level regulator employed may be varied, these constituting desirable but not essential features of the invention: it is further to be noted that the construction of the generator may be changed from the specific form shown in the drawings and may be of any construction embodying a receiving chamber and a return chamber with restricted passageways through which the liquid may be caused to boil by the application of heat to the receiving chamber and be thus delivered into the return chamber and freed of its vapor during the ebullition process.

It will become necessary from time to time to add additional absorption liquid to take up for losses that occur. For this purpose the reserve tank 8 is provided with a filling inlet 50 which is normally closed by a cap 51.

As hereinabove indicated, this equipment is adaptable for use generally for distillation purposes. When not used for recapturing the elements to be distilled out of natural gas the supply pipe 4 would, of course, be dispensed with and the liquid to be subject to the distillation process would be placed in the tower 1, which tower need not contain the partitions 2 and bubble caps 3. The heat exchanger could also be dispensed with and the pipe 26 connected directly into the lower portions of the tower 1 and the tube 35 connected directly into the tower beneath the level of the liquid therein. Also the liquid level regulator would not be essential. However, the pressure regulator valve 7 and a thermostatic heat regulator such as 34 should be retained. The reserve tank 8 might be advantageously retained but could be readily dispensed with.

Therefore, the invention in one of its forms will successfully operate as a thermo-generator distillation system when consisting only of the tower 1, the generator with the receiving chamber 17 and the return chamber 18 connected directly into the tower and connected by restricted passageways, the condenser for taking off the gas from the generator and the pressure heat regulators.

What we claim is:

1. Apparatus for recovering volatile hydrocarbons from gas passing from an oil well or the like comprising a liquid container; means for conducting gas from said well or the like to said container, a generating tower having a receiving chamber, a separate return chamber and restricted tubes leading from the receiving chamber and having free ends which terminate in the return chamber; open flues leading from the bottom to the top of the tower; conduits through which the liquid may be circulated from the container into the receiving chamber and returned from the return chamber into the container; means beneath the flues for heating the liquid in the receiving chamber to cause circulation thereof through said tubes into the return chamber whereby to cause separation of the gas, contained in the liquid, from the liquid and means for collecting and condensing the separated gas and means for withdrawing the condensed gas from the apparatus.

2. Apparatus for recovering volatile hydrocarbons from gas passing from an oil well or the like comprising a container for containing an absorption liquid, means for circulating said gas through the liquid to effect the absorption from the gas of the elements sought to be recovered, a generator, conduits through which the enriched liquid may be circulated from the container through the generator and returned into the container, means for heating the liquid passing through the generator to cause circulation of the liquid through said conduits, means including a plurality of percolator tubes for causing ebullition of the liquid in the generator to effect the liberation of the gas from the liquid and means for condensing the liberated gas and means for withdrawing the condensed gas from the apparatus.

3. In a petroleum still, a generator having a lower receiving chamber, an upper return chamber, a plurality of open flues leading upwardly through said chambers, a plurality of upstanding tubes leading from the receiving chamber and terminating in free ends in the return chamber, an inlet conduit for liquid entering the receiving chamber, a return conduit for liquid leading from the return chamber, means beneath the flues for heating the liquid in the receiving chamber to cause the circulation of liquid inwardly through the inlet conduit and through the tubes into the return chamber, and through the return conduit, said tubes forming means for liberating gas from the liquid discharged from the free ends of the tubes and a condenser for receiving and condensing the liberated gas.

4. In a petroleum distillation system a closed generating tower having a receiving chamber and a separate return chamber separated by a lower partition, a plurality of conduits anchored to said partition and leading from the receiving chamber and having free discharge ends terminating at a level above the receiving chamber through which the liquid is delivered, by the application of heat, from the receiving chamber to the return chamber, an upper partition across the tower forming the upper end of the return chamber, an inlet conduit for liquid entering the receiving chamber, a return conduit for liquid leading from the return chamber, and open flues leading upwardly through said chambers for the circulation of heat therethrough.

5. In a petroleum distillation system a generator having a receiving chamber and a separate return chamber, a plurality of restricted conduits leading from the receiving chamber and having free discharge ends terminating at a level above the receiving chamber through which the liquid is delivered, by the application heat, from the receiving chamber to the return chamber, an inlet conduit for liquid entering the receiving chamber and a return conduit for liquid leading from the return chamber and means for taking off, and condensing the vapor liberated from the liquid.

6. In the recovery of hydrocarbon liquid vapor from a gaseous carrier according to the absorption process the method which consists in continuously collecting the absorbing liquid, containing the elements to be extracted, in a chamber, applying heat to said collected liquid and thereby causing the ebullition of the liquid upwardly through a series of restricted passageways, and the sudden expansion of the liquid released from the upper ends of the passageways, to effect release of the vapors and the return of the liquid, freed from the vapors, into a return chamber separate from the receiving chamber.

7. In a still comprising a main liquid container, a pressure line for introducing a fluid under pressure into the container, a reserve liquid container connected into the main container beneath the liquid level therein, conduits connected into the pressure line and reserve container, respectively, valve means movable to one position to close both conduits and to another position to connect said conduits to subject the liquid in the reserve container to the pressure of the fluid flowing through said line, said valve means being movable to a third position to close the conduit leading to the pressure line and to open the conduit, leading to the reserve container, to free atmosphere and means responsive to the level of the liquid in the main container to control said valve means.

8. A petroleum distillation system comprising a container for an absorption liquid containing elements to be separated therefrom, a generator having a receiving chamber and a collection, or return, chamber, an inlet conduit leading from the container into the receiving chamber, a return conduit leading from the return chamber into the container, means for heating the liquid in the receiving chamber to cause its transfer into the return chamber, restricted tubes in the generator through which the heated liquid passes and having free ends in the return chamber for causing sudden expansion of the liquid emerging from the tubes to effect separation of said lighter elements, in the form of vapor, from the absorption liquid and means for collecting and condensing the separated vapor.

9. In a still, a main liquid container, a pressure line for introducing a fluid under pressure into the container, a reserve liquid container connected into the main container beneath the liquid level therein, conduits connected into the pressure line and reserve container, respectively, valve means movable to one position to close both conduits and to another position to connect said conduits to subject the liquid in the reserve container to the pressure of the fluid flowing through said line, said valve means being movable to a third position to close the conduit leading to the pressure line and to open the conduit, leading to the reserve container, to free atmosphere and means responsive to the level of the liquid in the main container to control the valve means.

10. In a still, a main liquid container, a pressure line for introducing a fluid under pressure into the container, conduits connected, one into the pressure line and the other being connected into the main liquid container, valve means movable to one position to close both conduits and to another position to connect said conduits to subject the liquid in the conduit connected into the main container to the pressure of the fluid flowing through said line, said valve means being movable to a third position to close the conduit leading to the pressure line and to open the other conduit to free atmosphere and means responsive to the level of the liquid in the main container to control said valve means.

11. In a petroleum still, a generating tower having upper and lower chambers and having a transverse partition separating said chambers, an open flue extending through both of said chambers, a plurality of percolating tubes whose lower ends are anchored to said partition and whose upper ends extend up into the upper chamber and are free, an inlet conduit entering the lower chamber, a return conduit leading from the upper chamber, means beneath the lower chamber for heating the liquid in the lower chamber to cause the liquid to flow inwardly through the inlet conduit into the lower chamber and upwardly through said tubes into the upper chamber, said tubes being restricted to cause the sudden expansion of the liquid as it emerges from the upper ends thereto to liberate the gas from the liquid and a condenser for receiving and condensing the liberated gas.

12. In a petroleum still, a main liquid container for containing an absorption liquid, means for circulating a gas through the liquid in the container to effect the absorption, from the gas, of the elements sought to be recovered, a generator having upper and lower chambers and a partition separating said chambers, a plurality of percolating tubes whose lower ends are anchored to the partition and whose upper ends extend up into the upper chamber and are free, an inlet conduit through which the enriched liquid is delivered from the container into said lower chamber, means for heating said enriched liquid in the lower chamber to cause circulation thereof upwardly through said tubes and the expansion thereof as the liquid emerges from the free ends of the tubes whereby the absorbed elements are liberated and the stripped liquid returned to the upper chamber, means for removing the liberated gas from the system for condensation and a conduit leading from the upper chamber and connected into the liquid container for returning the lean liquid into the container.

13. Apparatus for recovering hydrocarbons from gases passing from an oil well or the like comprising an absorption chamber, a conduit for said gases leading from said oil well or the like to said absorption chamber, a gas outlet leading from said absorption chamber, means for circulating a liquid absorbing agent for said hydrocarbons through said absorption chamber and for separating them from said absorbing agent comprising a generator comprising a receiving chamber for enriched absorbing agent, a return chamber thereabove, percolator tube means connecting said chambers and means for heating said receiving chamber to cause said absorbing agent to percolate through said tube means and to separate said hydrocarbons from the absorbing agent, conduits connecting said receiving and return chambers with said absorption chamber, a condenser, a gas conduit leading from said return chamber to said condenser and means for withdrawing condensed hydrocarbons from said condenser.

14. Apparatus for recovering hydrocarbons from gases passing from an oil well or the like comprising an absorption chamber, a conduit for said gases leading from said oil well or the like to said absorption chamber, a gas outlet leading from said absorption chamber, means for circulating a liquid absorbing agent for said hydrocarbons through said absorption chamber and for separating them from said absorbing agent comprising a generator comprising a receiving chamber for enriched absorbing agent, a return chamber thereabove, percolator tube means connecting said chambers and means for heating said receiving chamber to cause said absorbing agent to percolate through said tube means and to separate said hydrocarbons from the absorbing agent, conduits connecting said receiving and return chambers with said absorption chamber, a condenser, a gas conduit leading from said return chamber to said condenser and means for withdrawing condensed hydrocarbons from said condenser, and means for automatically controlling the heat and pressure in the apparatus.

JOHN H. MARTIN.
MAC MARTIN.